(12) United States Patent
Kobayashi et al.

(10) Patent No.: US 7,978,427 B2
(45) Date of Patent: Jul. 12, 2011

(54) DEVICE FOR EMBEDDING INFORMATION INTO DATA

(75) Inventors: Norikazu Kobayashi, Kanagawa (JP); Satoshi Tohji, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 12/282,165

(22) PCT Filed: Mar. 9, 2007

(86) PCT No.: PCT/JP2007/054646
§ 371 (c)(1), (2), (4) Date: Sep. 8, 2008

(87) PCT Pub. No.: WO2007/105624
PCT Pub. Date: Sep. 20, 2007

(65) Prior Publication Data
US 2009/0153990 A1 Jun. 18, 2009

(30) Foreign Application Priority Data
Mar. 10, 2006 (JP) .................... 2006-066108

(51) Int. Cl.
*G11B 5/02* (2006.01)
(52) U.S. Cl. .......................... 360/18; 360/40
(58) Field of Classification Search ............... None
See application file for complete search history.

(56) References Cited

U.S. PATENT DOCUMENTS

| | | | |
|---|---|---|---|
| 6,044,485 A | 3/2000 | Dent et al. | |
| 6,731,444 B2 * | 5/2004 | Teng et al. | 360/48 |
| 7,072,131 B2 | 7/2006 | Kimura et al. | |
| 7,430,702 B2 | 9/2008 | Taguchi | |
| 2003/0123660 A1 | 7/2003 | Fletcher et al. | |
| 2004/0083332 A1 | 4/2004 | Kimura et al. | |
| 2004/0161113 A1 | 8/2004 | Coene et al. | |
| 2005/0204257 A1 | 9/2005 | Taguchi | |
| 2006/0176600 A1 | 8/2006 | Kimura et al. | |
| 2009/0031187 A1 | 1/2009 | Taguchi | |

FOREIGN PATENT DOCUMENTS

CN 1111990 6/2003
(Continued)

OTHER PUBLICATIONS

International Search Report for PCT/JP2007/054646 mailed Jun. 5, 2007.

(Continued)

*Primary Examiner* — Jason C Olson
(74) *Attorney, Agent, or Firm* — David W. Victor; Konrad Raynes and Victor LLP

(57) ABSTRACT

An object of the present invention is to embed information while making effective use of a recording area at the time of recording data. To this end, a controller in a tape drive includes: a storage unit which stores information desired to be embedded; an acquisition unit which acquires the information stored in the storage unit; a writing unit which repeatedly writes a CQ set determined on the basis of the acquired information the number of times determined on the basis of this information; a reading unit which reads data in which information is embedded; and an identification unit which identifies information embedded in the read data, and which determines whether or not the read data can be used and the like, in comparison with this information and the information stored in the storage unit.

16 Claims, 9 Drawing Sheets

FOREIGN PATENT DOCUMENTS

| | | |
|---|---|---|
| CN | 1650364 | 8/2005 |
| EP | 1710712 | 11/2006 |
| GB | 1179781 | 1/1970 |
| JP | 2002-10191 | 1/2002 |
| JP | 2004-145920 | 5/2004 |
| JP | 2004145920 | 5/2004 |
| JP | 20045800 | 8/2004 |
| WO | 9829979 | 7/1998 |
| WO | 2005066823 | 7/2005 |

OTHER PUBLICATIONS

English Abstract for JP 2002-010191 dated Jan. 11, 2002.
English machine translation for JP 2002-010191 dated Jan. 11, 2002.
English Abstract for JP 2004-145920 dated May 20, 2004.
English machine translation for JP 2004-145920 dated May 20, 2004.
English Abstract for JP 2004-005800 dated Jan. 8, 2004.
English machine translation for JP 2004-005800 dated Jan. 8, 2004.
Patent Abstract for WO9829979, published on Mar. 29, 2000, 1 pg.
Patent Abstract for CN1650364, published on Aug. 3, 2005, 1 pg.
Chinese Office Action for Application No. CN101401163, dated Feb. 26, 2010, 5 pp.
International Search Report from EPO for Application No. 07738131.7-2223/2006853, dated Mar. 11, 2009, 8 pgs.
International Search Report from Japan Patent Office, for Application No. PCT/JP2007/054646, dated Jun. 5, 2007, 2 pgs.
O' Dushlaine et al., "Tandem Repeat Copy-Number Variation in Protein-Coding Regions of Human Genes", Jul. 28, 2005, Genome Biology, Bio med Central LTD., London, GB, 12 pgs.
Machine Translation for Application No. JP2004-5800, 28 pgs., May 20, 2004.
Patent Abstract for Application No. WO2005/066823, entitled Server, Terminal Apparatus, Device Registering System, Registering Method, Registering Program, and Recordeding Medium, published Jul. 21, 2007, 1 pg.

\* cited by examiner

DEVICE FOR EMBEDDING INFORMATION INTO DATA

BACKGROUND OF THE INVENTION

The present invention relates to an apparatus and the like for embedding information into data without making a change to the contents of the data.

The quality of digital data (data) recorded to a tape medium, such as a magnetic tape, will not degrade even if the data is copied to other tape medium. However, even now, it is difficult to distinguish whether a tape medium on which data is recorded is an original one or a copied one. This is because the recorded data can be copied sequentially using another tape drive, in a general method of recording data to a tape medium, the method specifying data is arranged and recorded sequentially along the driving direction of the tape medium, and thus. In other words, in a case where data is recorded sequentially and in regular order, simply copying this to other tape medium allows a copy of the original tape medium to be created easily.

Under these circumstances, a technique for enabling a user to discriminate whether a tape medium to which data is recorded is an original or a copy has been awaited. Here, among the data recorded to a tape medium, there are many data whose contents are not allowed to be changed. Accordingly, a technique has been proposed in which information for discriminating whether a tape medium is an original or a copy is embedded without making a change to the contents of the data (e.g., refer to Japanese Patent Application Publication No. 2004-145920). Specifically, in Patent Document 1, when data is divided into a plurality of data sets and the data sets are recorded to a tape medium, a distance between a data set and the subsequent data set is adjusted in order to embed information into the data.

However, in the technique of embedding information using a distance between the data sets as in the case of Patent Document 1, there is room for further increase in efficiency by improving the following point.

Specifically, the point is that a quantitative increase in the information to be embedded directly leads to waste of recording area.

SUMMARY OF THE INVENTION

The present invention has been made in view of the above-described circumstances. An object of the present invention is to increase the efficiency in embedding information into data.

Moreover, another object of the present invention is to embed information while making effective use of a recording area at the time of recording data.

For these purposes, in the present invention, information is embedded into data by using a repetition of blocks constituting the data. Specifically, an information-embedding apparatus of the present invention includes an acquisition unit and a processing unit. Among these units, the acquisition unit acquires information to be embedded. Moreover, the processing unit embeds the information into the data by repeating a specific process to a block the number of times determined on the basis of the information, the block determined among a plurality of blocks constituting the data on the basis of the information.

Here, as the specific process, firstly, a process to write data to a recording medium is listed. In this case, as a block, a CQ (Codeword Quad) set specified in the tape format of LTO is employed in particular. Rewriting a specific CQ set a specified number of times makes it possible to embed information.

By employing such an information-embedding technique, additional information can be written without having any effect on the recorded data.

Moreover, as the specific process, secondly, a process to transmit data via a network is also conceivable.

Moreover, the present invention can be viewed also as an apparatus for detecting data which is embedded as described above. In this case, the information detection apparatus of the present invention includes an acquisition unit and an identification unit. Among these units, the acquisition unit acquires a result of a specific process to data. The identification unit identifies the information on the basis of the number of times the specific process is repeated to a predetermined block among a plurality of blocks constituting the data, the number of times being obtained by analyzing the result.

Here, as the process to acquire the result, firstly, a process to read data which is written in the recording medium is listed. In this case, the embedded information is extracted at the time of reading the data. This makes it possible to identify the original tape, and control or prevent a copy.

Moreover, as the process to acquire the result, secondly, a process to receive data via a network is also conceivable.

Moreover, the present invention can be viewed also as a method of embedding information into data. In this case, the method of the present invention includes the steps of: acquiring information to be embedded; and repeating a specific process to a block the number of times determined on the basis of the information, the block determined among a plurality of blocks constituting the data on the basis of the information.

On the other hand, the present invention can be viewed also as a computer program for causing a computer to implement predetermined functions. In this case, the computer program of the present invention is a program for causing a computer, which carries out a specific process to data, to implement: a function to acquire information to be embedded; and a function which repeats the specific process to a block the number of times determined on the basis of the information, the block determined among a plurality of blocks constituting the data on the basis of the information.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

Hereinafter, the best mode for carrying out the present invention (hereinafter referred to as "embodiment") will be described in detail with reference to the accompanying drawings.

Figure 1:
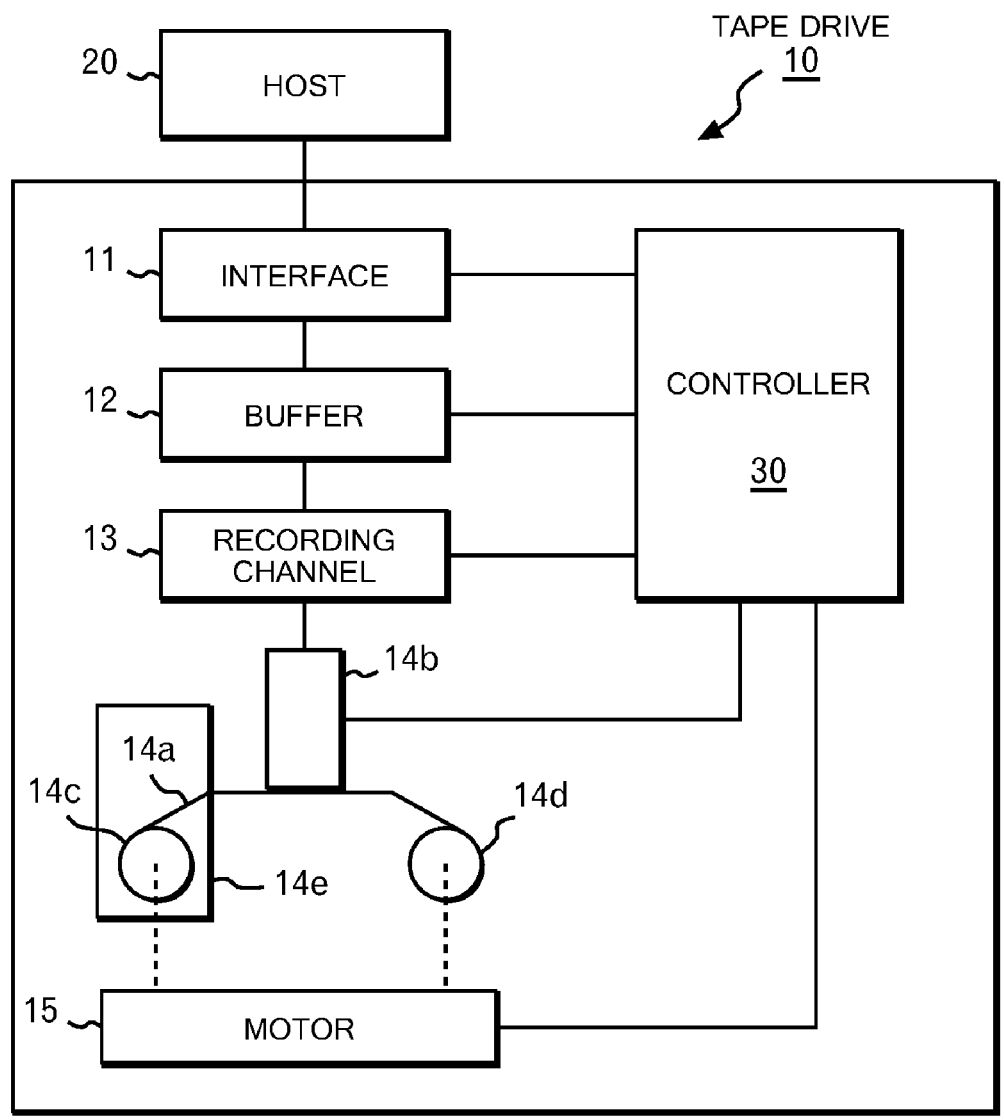
FIG. 1 is a diagram showing a configuration of a tape drive to which an embodiment of the present invention is applied.

FIG. 1 is a diagram showing a configuration of a tape drive 10 to which this embodiment is applied. This tape drive 10 includes an interface 11, a buffer 12 and a recording channel 13. This tape drive 10 further includes a tape 14a, a head 14b, reels 14c and 14d, a cartridge 14e, a motor 15 and a controller 30.

Among these, the interface 11 carries out communications with a host 20. For example, the interface 11 receives, from the host 20, a command instructing to write data into the buffer 12, and a command instructing the buffer 12 to write data to the tape 14a. Moreover, the interface 11 returns, to the host 20, a response indicating whether the processes in response to these commands have succeeded or failed.

The buffer 12 is a memory for storing the data to be written to the tape 14a. The buffer 12 is composed, for example, of DRAM (Dynamic Random Access Memory). Moreover, the buffer 12 stores data, which is sent from the interface 11, on a data set basis.

The recording channel 13 is a communication path used for writing data stored in the buffer 12 to the tape 14a.

The tape 14a is a tape medium used for recording data. Data delivered via the recording channel 13 is written to the tape 14a by the head 14b. Moreover, the tape 14a is wound around the reels 14c and 14d. As the reels rotate, the tape 14a moves in the longitudinal directions from the reel 14c to the reel 14d or from the reel 14d to the reel 14c. The cartridge 14e is a container for housing the reel 14c around which the tape 14a is wound. Another cartridge for housing the reel 14d may also be provided.

Moreover, the motor 15 rotates the reels 14c and 14d. It should be noted that, although the motor 15 is represented by one rectangular shape in FIG. 1, it is preferable that totally two motors for the reels 14c and 14d be provided as the motor 15.

On the other hand, the controller 30 controls the whole operation of the tape drive 10. For example, the controller 30 controls the data writing to the tape 14a in accordance with a command received by the interface 11. Moreover, the controller 30 detects whether the data writing to the tape 14a has succeeded or failed, and returns the detection result to the host 20 via the interface 11.

Incidentally, in this embodiment, the tape drive 10 records data to the tape 14a in accordance with a recording method specified as the 3rd generation of LTO (Linear Tape-Open). It should be noted that LTO is a standard for a tape format jointly developed by three companies, IBM, Hewlett Packard and Seagate Technology (presently, Quantum).

First of all, the recording method specified as the 3rd generation of LTO is described.

In LTO, user data transferred from the host 20 is firstly grouped into a unit called a data set. Then, each data set is further divided into a unit called sub data set, and is written to the tape 14a in regular order.

Figure 2:
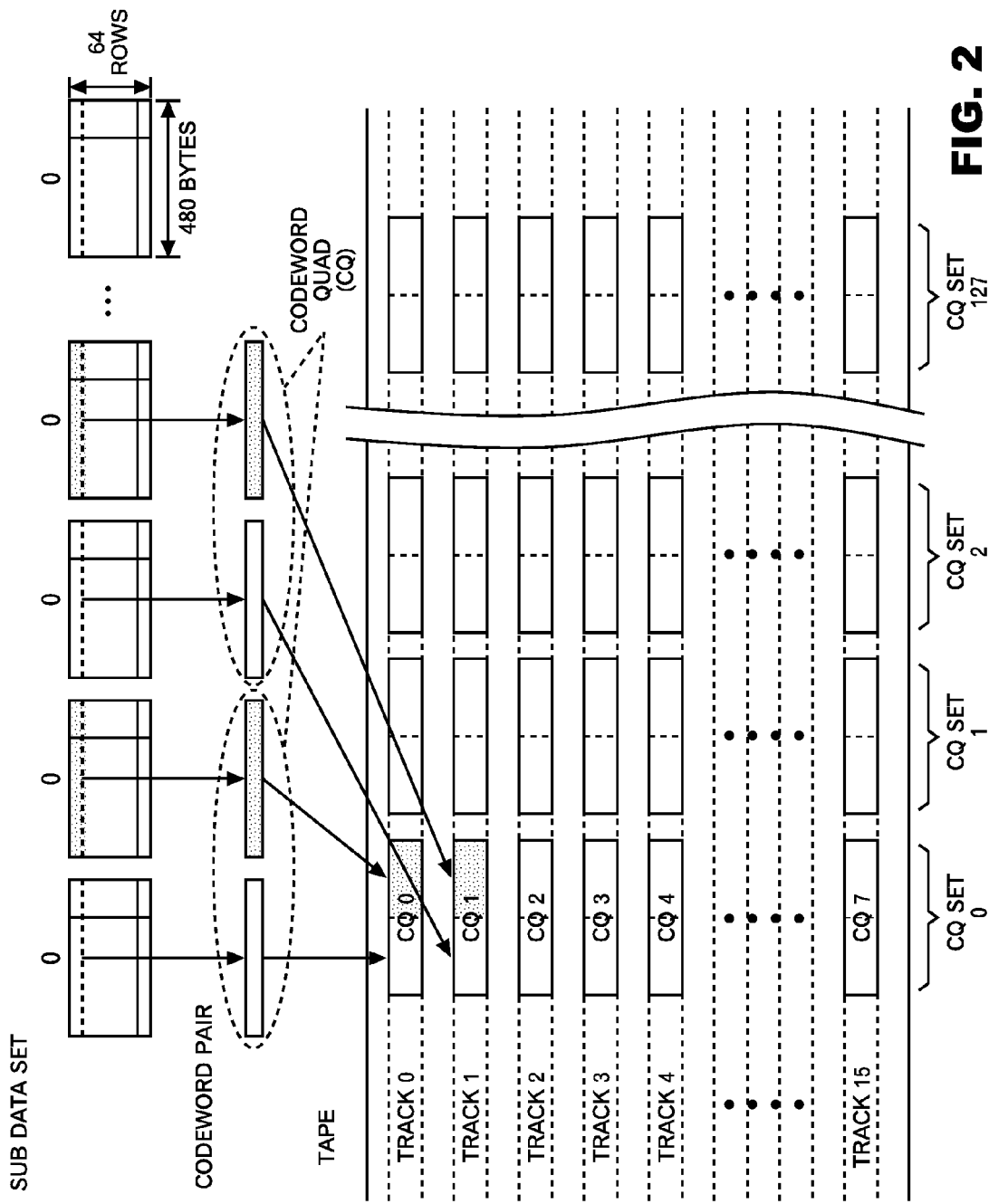
FIG. 2 is a diagram showing the state of writing from sub data set to a tape, in LTO which is a prerequisite for the embodiment of the present invention.

FIG. 2 is a diagram showing a situation where a data set divided into sub data sets is written to the tape 14a.

64 pieces of blocks of data shown as "Sub Data Set" in FIG. 2 correspond to 64 pieces of sub data sets constituting one data set. It should be noted that, although not explicitly shown in FIG. 2, an ECC (Error Correction Code) for correcting a data error is added to each sub data set. Moreover, each sub data set includes 64 rows each being a data sequence of 480 bytes.

Then, each row corresponds to a data unit shown as "Codeword Pair" in FIG. 2. Two codeword pairs are grouped to form a unit called a "Codeword Quad (CQ)", and are written to the tape 14a in this unit.

Moreover, FIG. 2 also shows a recording image of the CQs on the tape 14a. In the case of the 3rd generation of LTO, there are 16 tracks as the recording area on the tape 14a, and 16 write heads write CQs sequentially.

Here, in FIG. 2, the first row of Sub Data Set 0 and the first row of Sub Data Set 1 are combined to form a CQ0, and the CQ0 is recorded on Track 0. Moreover, the first row of sub data set 2 and the first row of sub data set 3 are combined to form a CQ1, and the CQ1 is recorded on Track 1. Hereinafter, in a similar manner, CQs 2, 3, 4, 5, . . . and 15 are formed of the first rows of Sub Data Sets 4, 5, . . . and 31, and are respectively recorded on Tracks 2, 3, 4, . . . and 15. In other words, these 16 CQs are generated from the first rows of the 32 Sub Data Sets, and are recorded on the same position in the longitudinal direction of the tape 14a respectively on the 16 tracks. A set of CQs on the same record position in the longitudinal direction on such a tape 14a is called a CQ set.

It should be noted that, although CQs in a CQ set 0 are arranged correspondingly to the track numbers in regular order such as the CQ0, 1, 2, . . . and 15 in FIG. 2, this is for convenience of description, and positions of CQs in a CQ set are usually randomized.

As described above, in the 3rd generation of LTO, 4096 (=64×64) codeword pairs are formed of one data set. These codeword pairs form 2048 (=4096/2) CQs, and form 128 (=2048/16) CQ sets. Then, FIG. 2 also shows the situation where the CQ set 0 to a CQ set 127 are recorded to the tape 14a. It should be noted that, in the following description, "N" in a CQ set N is referred to as a "CQ set number."

Moreover, although not shown in FIG. 2, a "codeword pair header" is added to each codeword pair at the time of grouping two codeword pairs into one CQ. With this codeword pair header, each CQ can be discriminated. Then, the format of a CQ including codeword pair headers is also described.

Figure 3:
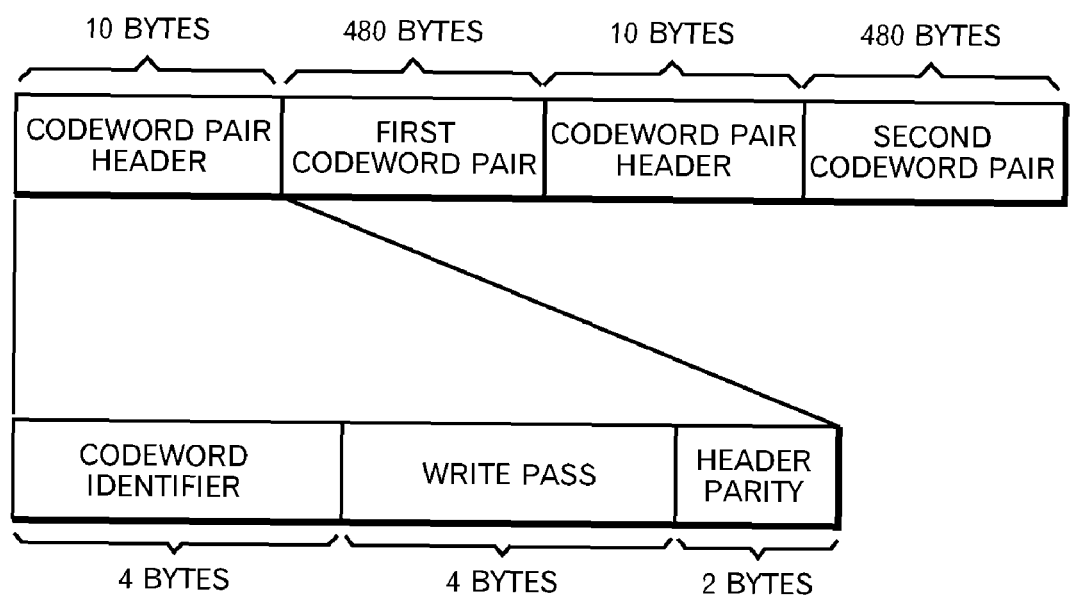
FIG. 3 is a diagram showing a CQ format in LTO which is a prerequisite for the embodiment of the present invention.

FIG. 3 is a diagram showing the format of a CQ. Two codeword pairs constituting one CQ are denoted as "First Codeword Pair" and "Second Codeword Pair" in FIG. 3. Then, a codeword pair Header of 10 bytes is added to each of these codeword pairs.

Then, this codeword pair header has a format as shown in FIG. 3. Specifically, the codeword pair header includes a "Codeword Identifier" of 4 bytes, a "Write Pass" of 4 bytes, and a "Header Parity of 2 bytes." Among these, the codeword identifier includes information for discriminating CQ sets, in addition to an ACN (Absolute CQ Sequence Number) which is a counter of the absolute number of times of writing CQ set. Specifically, with reference to this information, it is possible to know exactly the how-manieth CQ a CQ read from the tape 14a is. Incidentally, Write Pass is information for distinguishing the data set in a case where there was rewriting on a basis of a data set, and Header Parity is parity data regarding a codeword pair header.

The above is the general tape format specified as the 3rd generation of LTO. Specifically, as apparent from the record image on the tape 14a of FIG. 2, the CQ sets are usually written consecutively with no interval. However, in a case where a CQ set has not been written due to a defect or the like on the tape 14a, this CQ set is allowed to be written repeatedly, in LTO. In this case, although there is an upper limit value on the number of times in the standard, this CQ set is repeatedly written until it is correctly written. Then, eventually, the CQ set is correctly written. This is because, otherwise, the data set itself including this CQ set would not be correctly written. At this time, faulty CQ sets continue on the tape 14a. However, a read operation (including "Read While Write" at the time of writing) is carried out assuming that the last CQ set is correctly written. Specifically, a faulty CQ set is overwritten successively in a non-illustrated buffer region in the controller 30, and eventually is replaced with the last CQ set (which is supposed to be correctly written). Accordingly, no matter how many CQ sets including faulty ones exist, the CQ set lastly written is read.

Then, in this embodiment, information desired to be concealed is embedded using such repetition of a CQ set in LTO. Specifically, information is embedded by repeatedly writing a specific CQ set a specific number of times without making a change to the contents of the data.

It should be noted that, as described above, the rewriting of a CQ set used here is the one originally specified as an error recovery technique in LTO. However, even if a CQ set is repeatedly recorded using this positively in a case where there is no error occurring, no problems occur in terms of the standard. Moreover, the tape drive, which can not recognize that the repetition of a CQ set is due to the information embedding, only views the repetition of a CQ set as the repetition of a CQ set resulting from an error, and the information embedding is not recognized.

First, the information embedding using such rewriting of a CQ set is outlined using a specific example.

In a case where there is no rewriting of a CQ set, one data set is recorded to the tape 14a as 128 CQ sets from the CQ set 0 to the CQ set 127. Specifically, the record image on the tape 14a is the CQ set 0, a CQ set 1, a CQ set 2, a CQ set 3, . . . , a CQ set 126 and the CQ set 127.

On the other hand, assume that rewriting occurs twice in a CQ set 100. In this case, for the CQ set 100, two faulty CQ sets and a subsequent correct CQ set are recorded to the tape 14a. Namely, the record image on the tape 14a is the CQ set 0, the CQ set 1, the CQ set 2, the CQ set 3, . . . , a CQ set 99, the CQ set 100, the CQ set 100, the CQ set 100, a CQ set 101, the CQ set 126 and the CQ set 127. However, at the time of reading data from the tape 14a, the CQ set 100 lastly written is selected.

Here, let us consider that a CQ set M is rewritten N times repeatedly. In this case, the record image on the tape 14a is the CQ set 0, the CQ set 1, the CQ set 2, the CQ set 3, . . . , a CQ set M (1), a CQ set M (2), . . . , a CQ set M (N), . . . , the CQ set 126 and the CQ set 127. Specifically, by carrying out such recording, it is possible to embed information completely different from the recorded data into the data by specifying M and N, and also possible to extract the information embedded into the data.

Hereinafter, the information embedding and information extraction using the rewriting of a CQ set are described specifically. It should be noted that, data sent from the host 20 is assumed to be stored in the buffer 12 on a basis of a data set, and a CQ set generated from this data set is assumed to be stored in another non-illustrated buffer region.

Figure 4:
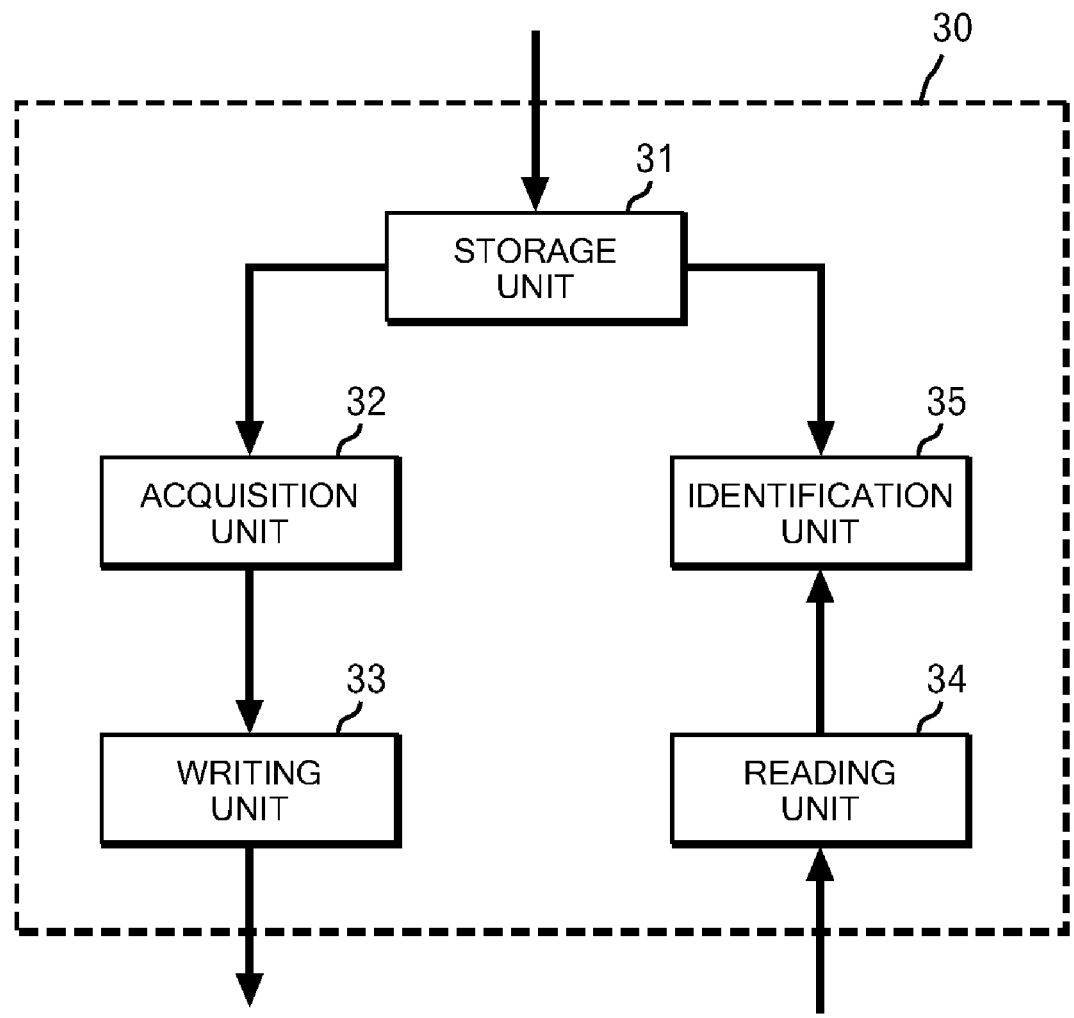
FIG. 4 is a diagram showing a functional configuration of a controller in the embodiment of the present invention.

FIG. 4 is a block diagram showing a functional configuration of the controller 30 which controls the operation of the information embedding and information extraction.

As shown in FIG. 4, the controller 30 includes a storage unit 31, an acquisition unit 32, a writing unit 33, a reading unit 34, and an identification unit 35.

Among these, the storage unit 31 stores information desired to be embedded at the time of recording data to the tape 14a. Here, as the information desired to be embedded, at least a set of two integers are stored. One integer is the number of a CQ set to be repeated, and another integer is the number of times that this CQ set is repeated. It should be noted that the storage unit 31 can be configured of various recording media such as a semiconductor memory and a magnetic disk.

The acquisition unit 32 acquires information stored in the storage unit 31, and holds this as corresponding information on the number of the CQ set and the number of times the CQ set is repeated.

The writing unit 33 writes a CQ set, which is fetched from the non-illustrated buffer region, to the tape 14a via the recording channel 13. Moreover, at this time, on the basis of the information which the acquisition unit 32 holds, the same CQ set is repeated several times.

The reading unit 34 reads the data, which is recorded to the tape 14a, via the recording channel 13. Moreover, at this time, how many times which CQ set is written repeatedly is analyzed.

The identification unit 35 identifies the information embedded in the data from the analysis result by the reading unit 34. Moreover, such a process as follows is also carried out. It is determined whether the read data can be used or not on the basis of a comparison result between the identified information and the information stored in the storage unit 31.

Next, an operation example of the controller 30 in this embodiment is described in detail.

FIRST OPERATION EXAMPLE

In this first operation example, a set of integers (M, N) are stored in the storage unit 31. Then, the acquisition unit 32 acquires (M, N) from the storage unit 31, and generates corresponding information on the number of a CQ set and the number of times of repetition of a CQ set, in advance. Specifically, although the CQ set M is written N times repeatedly in order to embed information, the other CQ sets are written only once unless an error occurs. Accordingly, the acquisition unit 32 associates the number of times "N" with the CQ set number M, and the number of times "1" with CQ set numbers other than M, and holds the same.

Once the acquisition unit 32 holds such corresponding information, the writing unit 33 starts to operate.

Figure 5:
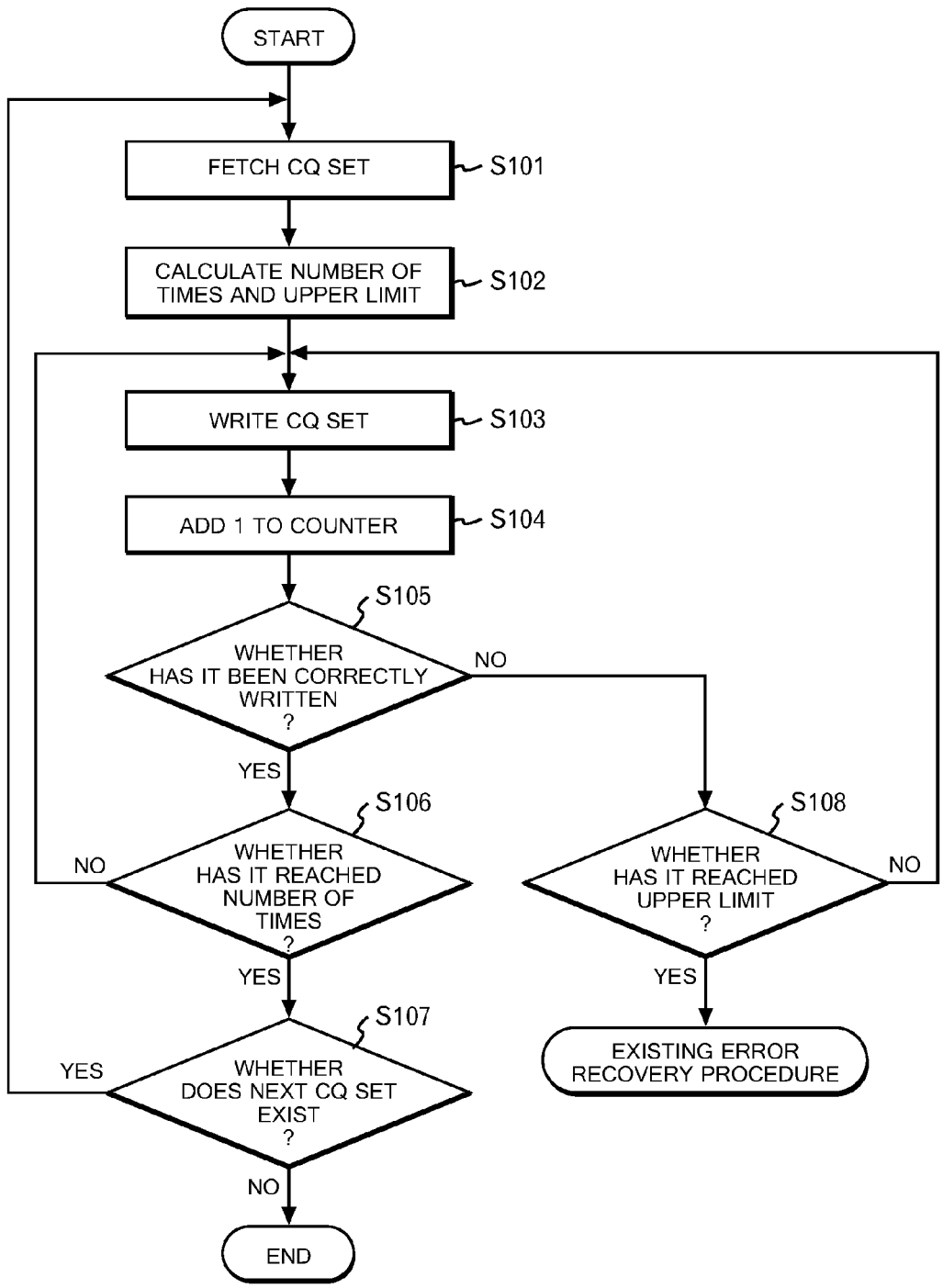
FIG. 5 is a flowchart showing a first operation example of a writing unit in the controller of the embodiment of the present invention.

FIG. 5 is a flowchart showing an operation example of the writing unit 33 in this case.

First, the writing unit 33 fetches a CQ set from the non-illustrated buffer region (Step S101). Then, on the basis of the number of the fetched CQ set, the number of times that this CQ set is written and an upper limit value of the number of times of writing this CQ set are calculated (Step S102).

Here, the number of times can be obtained by retrieving the corresponding information which the acquisition unit 32 holds, with the CQ set number being a key. Specifically, if the CQ set number M is used as a key, the number of times N can be obtained from the acquisition unit 32, and if a CQ set number other than M is used as a key, the number of times 1 can be obtained from the acquisition unit 32.

Moreover, the writing unit 33 determines the upper limit value in accordance with the number of times obtained here. Specifically, if the number of times is N, the upper limit value is also set at N. This is because even if an error occurs in the Nth writing, the CQ set M does not carry out the (N+1)th writing but has to stop writing at the N times. On the other hand, if the number of times is 1, the upper limit value in standard is employed. For the CQ set which is not used for information embedding, rewriting is carried out only due to an error. This is because it suffices to cause the rewriting not to be carried out more than the upper limit value in the standard in a case where an error occurs consecutively. It should be noted that, since the number of times of writing has an upper limit value in the standard in this way, a value not exceeding the upper limit value in the standard needs to be employed as the number of times N that the CQ set M is written.

Next, the writing unit 33 writes the CQ set, which is fetched from the buffer region in Step S101, to the tape 14a via the recording channel 13 (Step S103). Moreover, 1 is added to the counter for counting the number of times the CQ set is written (Step S104).

Then, the writing unit 33 determines whether or not the CQ set has been correctly written (Step S105). In LTO, as referred to as "Read While Write", data written by a write head is read with a read head positioned just behind so that it is verified whether or not this data is correctly written. Specifically, the read operation is carried out at the same time while carrying out the write operation. In this way, the controller 30 can verify, on a basis of a CQ unit, whether the writing has succeeded or not, can know the information for each CQ in real time, and can control the write operation. Accordingly, here, it is possible to determine whether or not the CQ set has been correctly written.

Here, first, a case where it is determined in Step S105 that the CQ set has been correctly written is described.

In this case, the writing unit 33 determines whether or not the counter value has reached the number of times acquired in Step S102 (Step S106). As a result, if the counter value has not reached the number of times, the process returns to Step S103. Specifically, the same CQ set is again written to the tape 14a in Step S103, 1 is added to the counter in Step S104, and it is determined whether or not it has been correctly written in Step S105.

It should be noted that the repetition of these steps in the process to the CQ set M corresponds to the repetition of a CQ set for embedding information. Specifically, since the writing unit 33 has to write the CQ set M N times, these steps are repeated until the number of times of writing reaches N times in Step S106.

On the other hand, in the process to a CQ set other than the CQ set M, the number of times acquired in Step S102 is "1." Accordingly, if a CQ set is written once, the judgment result in Step S106 is "Yes", so that the repetition of Steps S103 to S105 does not occur.

Then, if it is determined in Step S106 that the counter value has reached the number of times acquired in Step S102, the writing unit 33 determines whether or not the next CQ set exists (Step S107). As a result, if the next CQ set exists, the process proceeds to Step S101, and otherwise, the process is terminated.

Next, a case where it is determined in Step S105 that a CQ set has not been correctly written is described. Specifically, this is the case where the rewriting due to an error is carried out.

In this case, the writing unit 33 determines whether the counter value has reached the upper limit value acquired in Step S102 (Step S108). As a result, if it has not reached the upper limit value, the process returns to Step S103. Specifically, the same CQ set is again written to the tape 14a in Step S103, 1 is added to the counter in Step S104, and it is determined whether or not it has been correctly written in Step S105.

It should be noted that, although the repetition of these steps in the process to the CQ set M is the repetition due to an error, this also constitutes a part of the repetition of a CQ set for embedding information. Specifically, taking into consideration that the rewriting of a CQ set due to an error may occur in the middle of rewriting a CQ set for embedding information, the writing unit 33 can write the CQ set, which includes the one caused by an error, N times in total.

On the other hand, in the process to a CQ set other than the CQ set M, an upper limit value in the standard is acquired in Step S102. Accordingly, if write errors of a CQ set continue, Steps S103 to S105 are repeated until the number of times of writing reaches the upper limit value in the standard.

Then, if the judgment result in Step S108 becomes "Yes" before the judgment result in Step S106 becomes "Yes", the process proceeds to an existing error recovery procedure.

It should be noted that the case where the judgment result in Step S108 becomes "Yes" is a case where an error occurs in the Nth writing of the CQ set M. In such a case, the writing unit 33 cancels the writing of a data set including this CQ set, and writes this data set in another position on the tape 14a again. For example, in a case where a poor quality tape is used, errors may occur consecutively, and the rewriting due to the errors may exceed the upper limit in the standard. In preparation for such a situation, in LTO, it is allowed that the tape 14a is forwarded a little to avoid a defective portion of the tape 14a, thereby rewriting the data set itself. For this reason, such an existing error recovery procedure is used.

If the rewriting of a data set, which is the existing error recovery procedure, is continued until the CQ set M is written N times repeatedly in this manner, it is guaranteed that a given (M, N) is embedded for certain. Of course, no problems occur at the time of reading data because the rewriting is carried out on the basis of the normal error recovery procedure.

Next, the operations of the reading unit 34 corresponding to such operations of the writing unit 33 are described.

Figure 6:
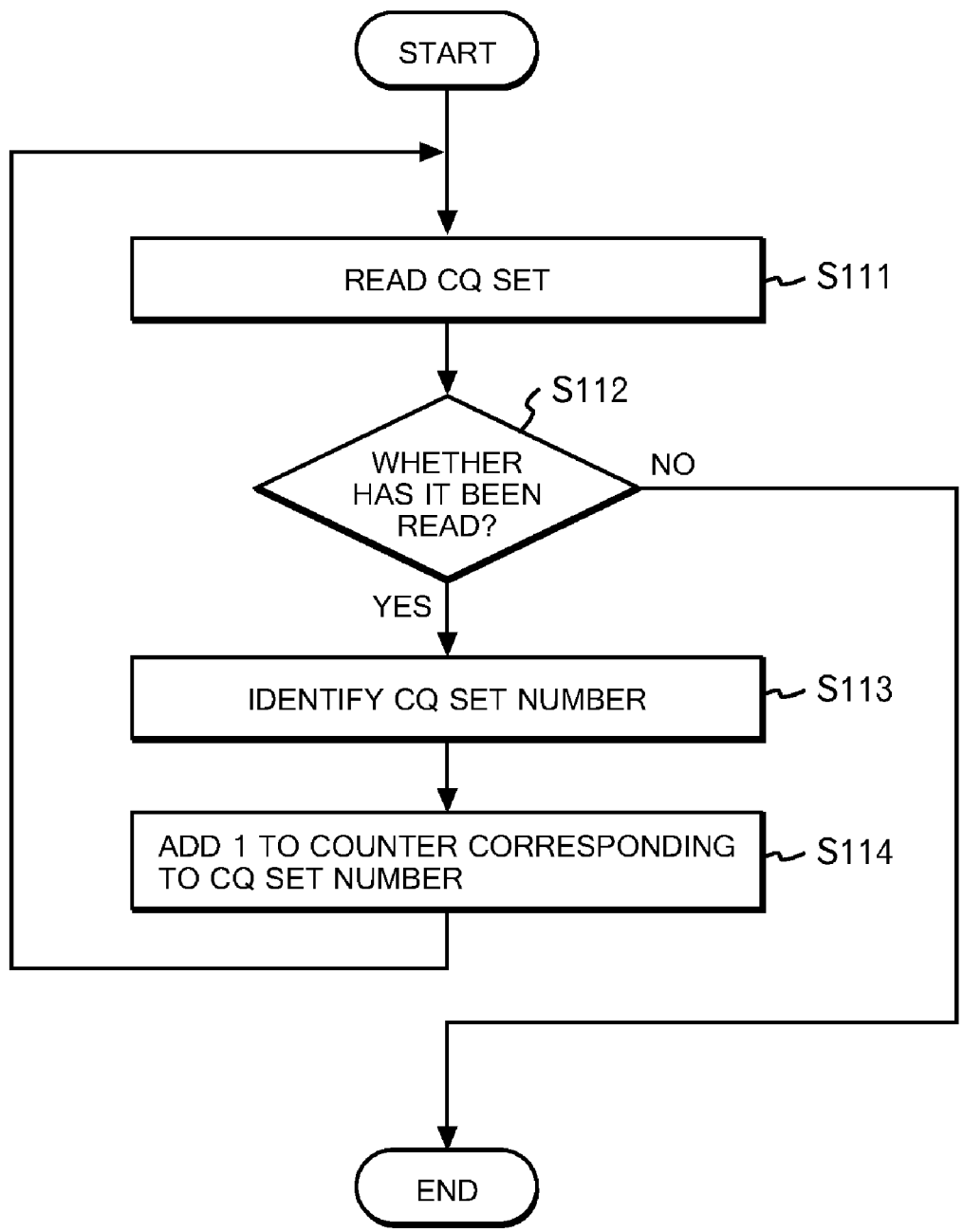
FIG. 6 is a flowchart showing an operation example of a reading unit in the controller of the embodiment of the present invention.

FIG. 6 is a flowchart showing the operations of the reading unit 33 in this case.

First, the reading unit 34 reads a CQ set from the tape 14a via the recording channel 13 (Step S111), and determines whether or not the CQ set has been correctly read (Step S112).

Here, if it is determined that the CQ set has not been correctly read, the process is terminated there. However, if it is determined that the CQ set has been correctly read, the number of this CQ set is identified (Step S113). Then, 1 is added to the counter corresponding to the number of this CQ set (Step S114). For example, it suffices that a region for storing a counter, which indicates the number of times the CQ set of this number is read, is prepared for each number of CQ sets in advance, and that a counter in a region corresponding to the number of this CQ set is counted up.

By carrying out this process to all the CQ sets, a correspondence between the CQ set number and the number of times of repetition of the CQ set is obtained. Then, this correspondence is delivered to the identification unit 35. Accordingly, the identification unit 35 acquires the correspondence between the CQ set number and the number of times of repetition of the CQ set. Of course, the repetition of a CQ set includes not only the one intended for embedding information but also the one resulting from an error. However, the identification unit 35 can identify the information embedded in data recorded to the tape 14a, on the basis of a set of integers (M, N) stored in the storage unit 31.

Specifically, the identification unit 35 extracts an integral set (M, N0) as embedded information, by paying attention to the number of times N0 of repetition of the CQ set M. Then, by determining whether or not N0 agrees with N, it is determined whether or not this data can be used, for example.

Specifically, if N0 agreed with N, the data is read as it is, and is transferred to the host 20. If N0 does not agree with N, the data reading is canceled.

In this way, in this embodiment, writing the CQ set M N times repeatedly makes it possible to embed an electronic watermark (M, N) without touching up the user data itself in the data set at all.

SECOND OPERATION EXAMPLE

In the first operation example, in a case where the Nth writing of the CQ set M failed, the data set is rewritten in accordance with the existing error recovery procedure. However, in a case where a first set of integers (M, N1) have not been realized for some reasons, it is also conceivable to change the operation hurriedly so as to realize a second set of integers (M, N2) (where N1<N2).

Then, in this second operation example, it is assumed that the first set of integers (M, N1) and the second set of integers (M, N2) are stored in the storage unit 31. Then, the acquisition unit 32 acquires (M, N1, N2) from the storage unit 31, and generates corresponding information between the CQ set number and a candidate of the number of times of repetition of the CQ set, in advance. Specifically, although the CQ set M is written N1 times or N2 times repeatedly in order to embed information, the other CQ sets are written only once unless an error occurs. Accordingly, the acquisition unit 32 associates the numbers of times N1 and N2 with the CQ set number M, and associates the number of times "1" with CQ set numbers other than M, and hold the same.

Once the acquisition unit 32 holds such corresponding information, the writing unit 33 starts to operate.

Figure 7:
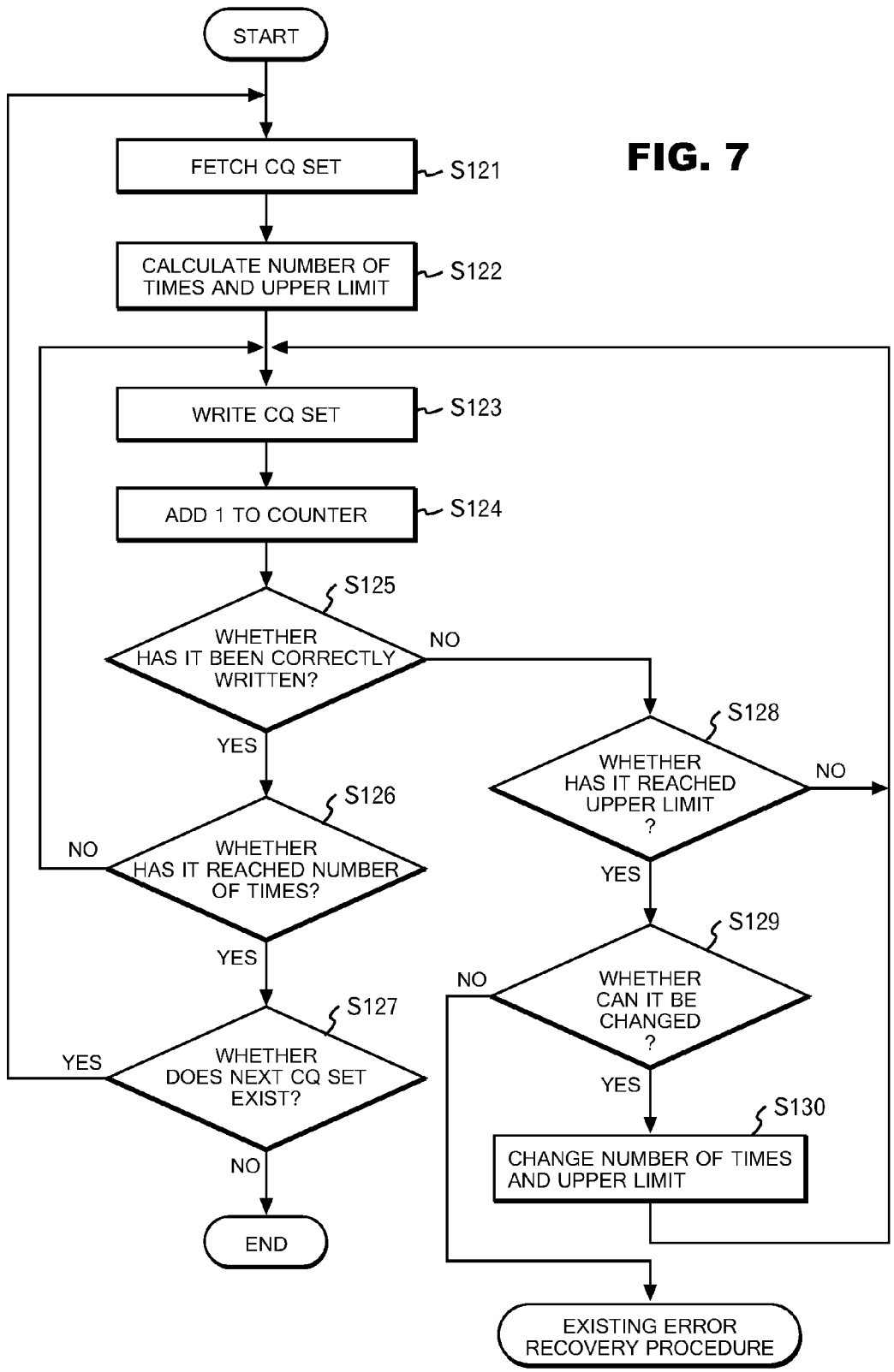
FIG. 7 is a flowchart showing a second operation example of the writing unit in the controller of the embodiment of the present invention.

FIG. 7 is a flowchart showing an operation example of the writing unit 33 in this case.

First, the writing unit 33 fetches a CQ set from the non-illustrated buffer region (Step S121). Then, on the basis of the number of the fetched CQ set, the number of times this CQ set is written is calculated, and an upper limit value of the number of times of writing this CQ set is calculated (Step S122).

Here, the number of times can be obtained by retrieving the corresponding information which the acquisition unit 32 holds, with the CQ set number being a key. It should be noted that, if two number of times are held, a smaller one of them is acquired. Specifically, if the CQ set number M is used as a key, the number of times N1 can be obtained from the acquisition unit 32, and if a CQ set number other than M is used as a key, the number of times 1 can be obtained from the acquisition unit 32.

Moreover, the writing unit 33 determines the upper limit value in accordance with the number of times obtained here. Specifically, when the number of times is N1, the upper limit value is also set at N1. It should be noted that, in this operation example, in a case where an error occurs in the N1-th writing, the number of times and the upper limit value are changed to N2. However, this N2 is acquired in Step S130 described later, and here, N1 is acquired as the initial value of the number of times and upper limit value. On the other hand, when the number of times is 1, the upper limit value in the standard is employed. For the CQ set which is not used for information embedding, rewriting is carried out only due to an error. This is because it suffices to cause the rewriting not to be carried out more than the upper limit value in the standard in a case where errors occur consecutively. It should be noted that, since the number of times of writing has an upper limit value in the standard this way, a value not exceeding this upper limit value in the standard needs to be employed as the larger value N2 among the numbers of times the CQ set M is written.

Next, the writing unit 33 writes the CQ set, which is fetched from the buffer region in Step S121, to the tape 14a via the recording channel 13 (Step S123). Moreover, 1 is added to the counter for counting the number of times the CQ set is written (Step S124).

Then, the writing unit 33 determines whether or not the CQ set has been correctly written (Step S125).

Here, first, a case where it is determined in Step S125 that the CQ set has been correctly written is described.

In this case, the writing unit 33 determines whether or not the counter value has reached the number of times acquired in Step S122 (Step S126). As a result, if the counter value has not reached the number of times, the process returns to Step S123. Specifically, the same CQ set is again written to the tape 14a in Step S123, 1 is added to the counter in Step S124, and it is determined whether or not it has been correctly written in Step S125.

It should be noted that the repetition of these steps in the process to the CQ set M corresponds to the repetition of a CQ set for embedding information. Specifically, since the writing unit 33 has to write the CQ set M N1 times, these steps are repeated until the number of times of writing reaches N1 times in Step S126.

On the other hand, in the process to a CQ set other than the CQ set M, the number of times acquired in Step S122 is "1." Accordingly, if the CQ set is written once, the judgment result in Step S126 becomes "Yes", so the repetition of Steps S123 to S125 does not occur.

Then, in a case where it is determined in Step S126 that the counter value has reached the number of times acquired in Step S122, the writing unit 33 determines whether or not the next CQ set exists (Step S127). As a result, if the next CQ set exists, the process proceeds to Step S121, and otherwise, the process is terminated.

Next, a case where it is determined in Step S125 that the CQ set has not been correctly written is described. Specifically, this is the case where rewriting due to an error is carried out.

In this case, the writing unit 33 determines whether the counter value has reached the upper limit value acquired in Step S122 (Step S128). As a result, if it has not reached the upper limit value, the process returns to Step S123. Specifically, the same CQ set is again written to the tape 14a in Step S123, 1 is added to the counter in Step S124, and it is determined whether or not it has been correctly written in Step S125.

It should be noted that, although the repetition of these steps in the process to the CQ set M is the repetition due to an error, these also constitute a part of the repetition of a CQ set for embedding information. Specifically, taking into consideration that rewriting a CQ set due to an error may occur in the middle of rewriting a CQ set for embedding information, the writing unit 33 can write the CQ set, which includes the one caused by the error, N1 times in total.

On the other hand, in the process to a CQ set other than the CQ set M, the upper limit value in the standard is acquired in Step S122. Accordingly, if write errors of the CQ set continue, Steps S123 to S125 are repeated until the number of times of writing reaches the upper limit value in the standard.

Moreover, in a case where it is determined in Step S128 that the counter value has reached the upper limit value, the writing unit 33 determines whether or not the number of times and the upper limit value can be changed (Step S129).

As a result, if it is determined that they can be changed, the number of times and the upper limit value are changed (Step S130).

Specifically, in the process to the CQ set M, if the number of times and the upper limit value at a given time are N1, it is determined that N1 can be changed to N2, and thus the number of times and the upper limit value are set at N2. Such judgment can be carried out using, for example, a flag indicating whether or not the number of times and the upper limit value have been changed. Specifically, in the initial condition the flag is set at "0", and in a case where the number of times and the upper limit value are changed, the flag is set at "1." Then, in Step S129, if the flag is set at "0", it is determined that the number of times and the upper limit value can be changed, and if the flag is being set at "1", it is determined that the number of times and the upper limit value can not be changed any more.

On the other hand, in the process to a CQ set other than the CQ set M, it is always determined that they can not be changed. This is because the upper limit value in the standard can not be increased any more. For example, in the case where such judgment is carried out using the flag as described above, it suffices to set the flag at "1" in the initial condition.

It should be noted that the number of times and the upper limit value after the change in Step S130 can be obtained by retrieving the corresponding information which the acquisition unit 32 holds, with the CQ set number being a key. Specifically, the number of times N2 can be obtained by retrieving with the CQ set number M being a key.

Then, once the number of times and the upper limit value are changed, the process returns to Step S123. Specifically, the same CQ set is again written to the tape 14a in Step S123, 1 is added to the counter in Step S124, and it is determined whether or not it has been correctly written in Step S125. Moreover, In a case where it is determined that the same CQ set has been correctly written in Step S125, it is determined in Step S126 whether or not the counter value has reached the number of times after the change. In a case where it is determined that the same CQ set has not been correctly written in Step S125, it is determined in Step S128 whether or not the counter value has reached the upper limit value after the change.

Then, in a case where the judgment result in Step S128 becomes "Yes" before the judgment result in Step S126 becomes "Yes", the judgment result in Step S129 becomes "No", so the process proceeds to the existing error recovery procedure.

It should be noted that the case where the judgment result in Step S128 becomes "Yes" is the case where an error occurs in the N2-th writing of the CQ set M. In such a case, the writing unit 33 cancels the writing of data sets including this CQ set, and writes this data set in another position on the tape 14a again.

Next, the operations of the reading unit 34 corresponding to such operations of the writing unit 33 are described.

In this case, the reading unit 34 carries out operations similar to those shown in FIG. 6. Specifically, a correspondence between a CQ set number and the number of times of repetition of the CQ set is acquired and delivered to the identification unit 35. Accordingly, the identification unit 35 identifies information embedded in the data recorded to the tape 14a, on the basis of the first set of integers (M, N1) and the second set of integers (M, N2), both of which are stored in the storage unit 31.

Specifically, the identification unit 35 extracts a set of integers (M, N0) as the embedded information, by paying attention to the number of times N0 of repetition of the CQ set M. Then, by determining whether or not N0 agrees with N1 or N2, it is determined, for example, whether or not this data can be used. Specifically, if N0 agrees with N1 or N2, the data is read as it is, and is transferred to the host 20. If N0 agrees with neither N1 nor N2, the data reading is canceled.

In this way, in this embodiment, the CQ set M is written N1 times repeatedly, and in a case where an error occurs in the N1-th writing, the number of times of repetition is changed to N2. This makes it possible to carry out an electronic-watermark-embedding process more efficiently without touching up the user data itself in the data set at all. Specifically, in the first operation example, in a case where the CQ set of the number of times specified at the beginning can not be repeated, rewriting is carried out in the large unit called a data set including this CQ set. However, in this second operation example, a process for embedding information can be carried out consecutively even without rewriting the data set.

Incidentally, in this embodiment, information desired to be embedded was described as a simple combination of integers (M, N). However, even if an accidental error occurs at the time of extracting M and N, this can be detected by placing a certain restriction on a combination of these integers. Then, in such a case, it suffices to activate an operation such as re-reading which is carried out in the normal read operation. Specifically, it suffices that the detection of impossible M and N is added as one of the errors in the normal read operation. It should be noted that, as a certain restriction which can be placed on a combination of integers here, it is conceivable to construct M and N with prime numbers.

Moreover, in this embodiment, a set of integers (M, N) or the like appeared from the beginning as information desired to be embedded, but it is not limited to such an embodiment. For example, in a case where information desired to be embedded is a numeric string, the processes as described above may be carried out after carrying out a certain calculation to this string and obtaining the set of integers (M, N).

Moreover, in this embodiment, in which portion of the data recorded to the tape 14a the electronic watermark (M, N) is embedded has not been described in detail. Then, hereinafter, a configuration example concerning this point is described.

For example, in most of backup applications, a "Volume Serial" for distinguishing the tape and header information for describing the information on the tape is often written in the leading area of the tape. On the other hand, the user data is often delimited by a plurality of special marks called "File Mark." Accordingly, it may be configured so that information can be embedded by the technique of this embodiment only in a case of writing the leading area of this tape or in a case of writing File Mark. This configuration can reduce waste of tape capacity as compared with the case where information is embedded in all the data sets.

Usually, the application carries out a Rewind operation once a tape medium is mounted. At this time, an LTO-compliant drive reads a special data set called FID, which is written in the leading area of the tape medium. After the Rewind operation is completed, it is possible to determine whether or not to permit execution of a Read command or a Write command, which will be issued next, on the basis of information concealed in a data set group following the FID.

Moreover, File Mark is often written as the delimiter of the user data. Accordingly, the application carries out retrieval or the like of data, with the File Mark being a clue. Specifically, first, a data set including the File Mark is sequentially read. At this time, a data set including header information for each user data following the File Mark is also read. Here, it is also possible to acquire the concealed information from the CQ set information of this data set group, and determine whether or not to permit the subsequent user data to be read, on the basis of this information. Moreover, at this time, control such as read inhibit for each user data is also conceivable.

As described above, according to this embodiment, a tape can be distinguished by embedding a certain pattern without changing the recorded data at all. Specifically, since this certain embedded pattern is lost in a case where a tape is copied by an ordinary method, it can be detected that the tape is not the original. Alternatively, when an attempt is made to copy a tape, this pattern is detected, thereby the copying can be prevented.

In recent years, it is required that high security is maintained in computer systems. However, because LTO is an open standard, it is risky to store information desired to be concealed, in a place such as a cartridge memory which is the disclosed standard, and copying this is also easy. On the other hand, this embodiment provides information-embedding technique which is sufficiently effective for a tape format such as LTO with no copy control.

In addition, the technique of this embodiment is significantly efficient as compared with the technique described in Patent Document 1, for example. In a case where information is embedded using a distance between data sets, as in the case in Patent Document 1, there is room for further increase in efficiency in the following points.

Usually, in a case where information is embedded using a distance between data sets, a minimum unit for controlling the distance is often set at 1 LPOS. On the other hand, in this embodiment, information can be embedded theoretically on a basis of one CQ. For example, in the tape format specified as the 3rd generation of LTO, one CQ is $1/128$ of one data set length. Specifically, assuming that one data set is set at approximately 10 LPOS at the minimum, the efficiency is approximately 13 (=128/10) times better than that in the case of Patent Document 1.

It should be noted that, in the above, it has been described about the information embedding by repeating the Mth CQ set N times at the time of recording data to a tape medium in accordance with the tape format specified by LTO. However, if not sticking to the tape format specified by LTO, any unit may be employed as the unit of data, the unit being repeated at the time of embedding information. Specifically, this embodiment may be viewed also as the one for writing the Mth block N times repeatedly in the case where the data is composed of a plurality of blocks.

Moreover, it has been described about embedding the electronic watermark (M, N) by "writing the Mth block N times repeatedly" at the time of recording data.

However, if "writing the Mth block N times repeatedly" is considered as the transmission and reception of data between computers, it can be also interpreted as "resending the Mth block N times repeatedly."

However, the case where such an interpretation is possible is considered to be the case where the following conditions are satisfied.
1. Two-way communications are carried out in accordance with a communications protocol (for cellular phones, serial, SCSI, fiber channel or the like).
2. Data is separated into blocks, and each block can be identified as a unique one. Specifically, each block is numbered.
3. There is a protocol for resending data in a case where a problem occurs during data transfer, and thereby a specific block can be resent.
4. At the side of receiving the data, it is possible to securely know how many times the specific block has been resent.

Figure 8:
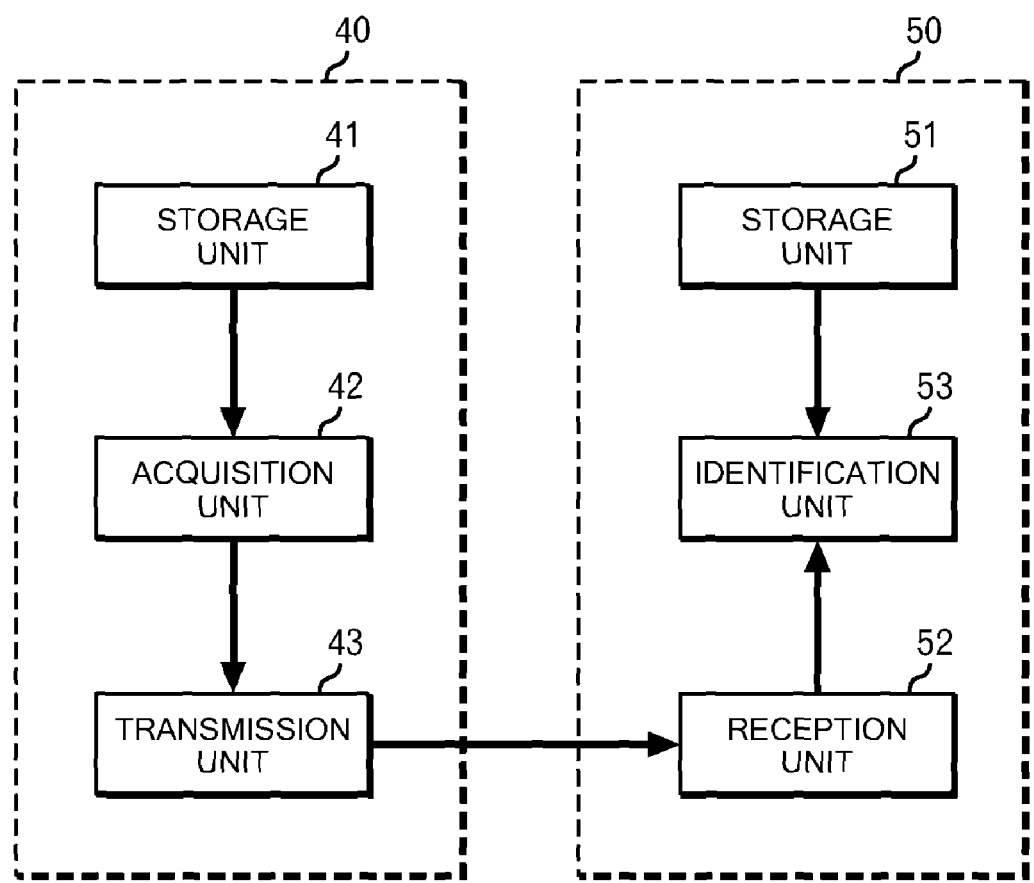
FIG. 8 is a diagram showing another configuration example of the embodiment of the invention.

FIG. 8 is a block diagram showing a configuration of a computer system for realizing information-embedding by "resending the Mth block N times" in this manner.

As illustrated in FIG. 8, this computer system includes a transmitter 40 and a receiver 50.

Then, the transmitter 40 includes a storage unit 41, an acquisition unit 42, and a transmission unit 43.

Among these, the storage unit 41 stores information desired to be embedded at the time of transmitting data to the receiver 50. Here, as the information desired to be embedded, at least a set of two integers are stored. One integer of them is the number of the block to be resent, and another integer is the number of times that transmission of this block is repeated. It should be noted that this storage unit 41 can be configured of various recording media such as a semiconductor memory and a magnetic disk.

The acquisition unit 42 acquires the information stored in the storage unit 41, and holds this as corresponding information between the number of the block to be transmitted and the number of times that transmission of the block is repeated.

The transmission unit 43 transmits a block, which constitutes the data to be transmitted, to the receiver 50. Moreover, at this time, the same block is repeated several times on the basis of the information which the acquisition unit 42 holds.

Moreover, the receiver 50 includes a storage unit 51, a reception unit 52, and an identification unit 53.

Among these, the storage unit 51 stores information which is supposed to be embedded in data to be transmitted. It should be noted that this storage unit 51 can be configured of various recording media such as a semiconductor memory and a magnetic disk.

The reception unit 52 receives the data transmitted by the transmitter 40. Moreover, at this time, how many times which block has been written repeatedly is analyzed.

The identification unit 53 identifies the information embedded in the data, from the analysis result by the reception unit 52. Moreover, the identification unit 53 also carries out such a process as determining whether or not the received data can be used, on the basis of a comparison result between the identified information and the information stored in the storage unit 51.

Then, this computer system embeds information into data by carrying out operations similar to those of the controller 30.

Specifically, in the transmitter 40, first, the acquisition unit 42 acquires information stored in the storage unit 41, and next, the transmission unit 43 carries out operations similar to those shown in the flowchart shown in FIG. 5 or FIG. 7. Specifically, "CQ set," "write" and "written?" in FIG. 5 or FIG. 7 are respectively read as "block," "transmit" and "transmitted?" This is the flow of operations by the transmission unit 43.

Moreover, in the receiver 50, first, the reception unit 52 carries out operations similar to those shown in the flowchart in FIG. 6. Specifically, "CQ set," "read" and "is read?" in FIG. 6 are respectively read as "block," "receive" and "is received?" This is the flow of operations by the reception unit 52. Then, the identification unit 35 identifies the information embedded in the received data, and determines whether or not the received data can be used, and the like, on the basis of a comparison between this information and the information stored in the storage unit 51.

Moreover, in light of the ordinary data processing, this embodiment can be viewed also as the one for "carrying out a process to the Mth block N times."

Figure 9:
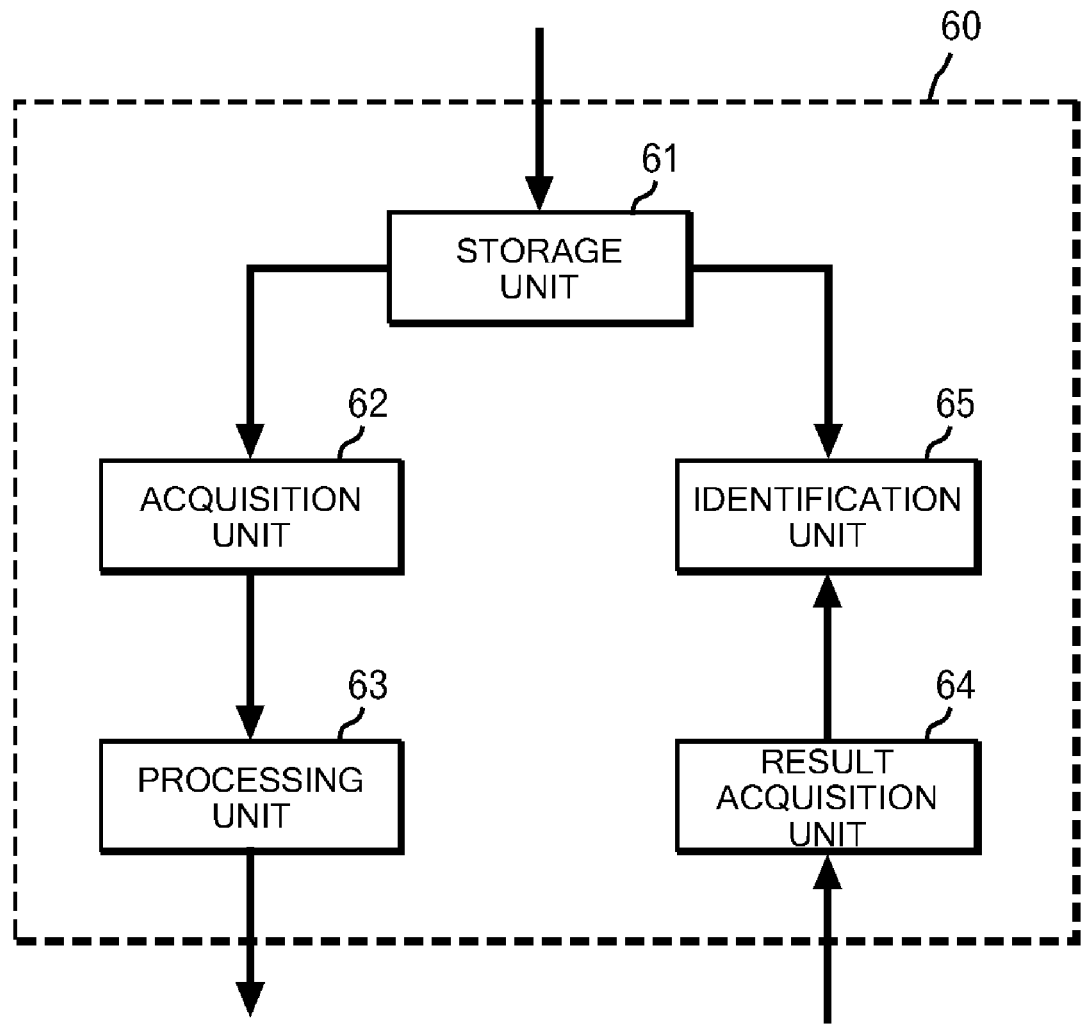
FIG. 9 is a diagram showing still another configuration example of the embodiment of the present invention.

FIG. 9 is a block diagram showing a functional configuration of a data processing apparatus 60 for realizing information-embedding by "carrying out a process to the Mth block N times."

As illustrated in FIG. 9, this data processing apparatus 60 includes a storage unit 61, an acquisition unit 62, a processing unit 63, a result acquisition unit 64, and an identification unit 65.

Among these, the storage unit 61 stores information desired to be embedded at the time of carrying out a predetermined process to data. Here, as the information desired to be embedded, at least a set of two integers are stored. One integer is the number of the block to be processed repeatedly, and another integer is the number of times that the process is repeated to this block. It should be noted that this storage unit 61 can be configured of various recording media such as a semiconductor memory and a magnetic disk.

The acquisition unit 62 acquires information stored in the storage unit 61, and holds this as corresponding information between the number of the block, and the number of times that the block is repeated.

The processing unit 63 carries out a predetermined process to a given data. Moreover, at this time, the same block is repeated several times on the basis of the information which the acquisition unit 62 holds.

The result acquisition unit 64 acquires a result of the process by the processing unit 63. Moreover, at this time, how many times the process has been repeated to which block is analyzed.

The identification unit 65 identifies the information embedded in the data from the analysis result by the result acquisition unit 64. Moreover, it also carries out such a process as determining whether or not the process result can be used, on the basis of a comparison result between the identified information and the information stored in the storage unit 61.

Then, the data processing apparatus 60 embeds information into data by carrying out operations similar to those of the controller 30.

Specifically, first, the acquisition unit 62 acquires information stored in the storage unit 61, and next, the processing unit 63 carries out operations similar to those shown in the flowchart in FIG. 5 or FIG. 7. Specifically, "CQ set," "write" and "written?" in FIG. 5 or FIG. 7 are respectively read as "block," "process" and "processed?" This is the flow of operations by the processing unit 63.

Moreover, the result acquisition unit 64 carries out operations similar to those shown in the flowchart in FIG. 6. Specifically, "CQ set," "read" and "is read?" in FIG. 6 are respectively read as "block," "acquire a result" and "acquired a result?" This is the flow of operations by the result acquisition unit 64. Then, the identification unit 65 identifies the information embedded in the received data, and determines whether or not the received data can be used, and the like, on the basis of a comparison between this information and the information stored in the storage unit 61.

It should be noted that the information stored in the storage unit 61 may be provided, for example, from an external host via a communications interface. Alternatively, in contrast, the information may be sent to the external host via the communications interface.

Moreover, it also serves the purpose that this information is generated and provided using a predetermined method outside the data processing apparatus 60, or that this information is generated using a predetermined method within the data processing apparatus 60.

Here, the present inventions may be implemented all in hardware or may be implemented all in software. Moreover, implementation by both hardware and software is also possible.

Furthermore, the present invention can be realized as a computer, a data processing system, or a computer program. This computer program can be stored in a computer readable medium and be provided. Here, as the medium, electronic, magnetic optical, electromagnetic, infrared, or a semiconductor system (apparatus or device), or propagation medium is conceivable. Moreover, examples of the computer readable medium include a semiconductor, a solid-state storage device, a magnetic tape, a removable computer diskette, a random-access memory (RAM), a read only memory (ROM), a rigid magnetic disk, and an optical disk. Examples of the optical disk at present include a compact disc read only memory (CD-ROM), compact disc read/write (CD-R/W), and DVD.

According to the present invention, it is possible to increase the efficiency in embedding information into data.

Although the preferred embodiment of the present invention has been described in detail, it should be understood that various changes, substitutions and alternations can be made therein without departing from spirit of the inventions as defined by the appended claims.

What is claimed is:

1. A method, comprising:
acquiring information to be embedded;
determining from the information to be embedded a specified block of a plurality of blocks and a first number of times to repeat the specified block;
performing a process the first number of times with respect to the specified block to embed the information; and
performing the process with respect to the plurality of blocks other than the specified block a second number of times different from the first number of times.

2. The method of claim 1, wherein the process comprises writing the specified block the first number of times to a recording medium.

3. The method of claim 1, wherein the plurality of blocks are Codeword Quads (CQs) set in a Linear Tape Open (LTO) format.

4. The method of claim 1, wherein the process comprises transmitting the blocks over a network.

5. The method of claim 1, further comprising:
determining that the process failed when performed a last time of the first number of times; and
nullifying the process performed on the specified block.

6. The method of claim 1, further comprising:
determining that the process fails when performed a last time of the first number of times; and
performing the process the first number of times with respect to the specified block in response to determining that the process failed.

7. The method of claim 6, wherein the performing the process the first number of times in response to determining that the process failed comprises:
writing the specified block the first number of times to a different portion of a recording medium that was written to when the process failed.

8. The method of claim 1, further comprising:
determining that the process fails when performed a last time of the first number of times;
determining whether a third number of times, different from the first number of times, can be used in response to determining that the process failed; and
performing the process the third number of times with respect to the specified block in response to determining that the third number of times can be used.

9. The method of claim 1, further comprising:
acquiring a result of the process performed the first number of times with respect to the specified block;
determining from the acquired result a determined number of times the process was repeatedly performed on a determined block;
accessing a number of times and a specified block from a storage unit;
determining whether the determined number of times and the determined block determined from the acquired result matches the number of times and the specified block accessed from the storage unit; and
permitting an operation in response to determining the match.

10. The method of claim 9, wherein the acquiring the result comprises reading data written to a recording medium including the specified block.

11. The method of claim 9, wherein the acquiring the result comprises receiving data transmitted over a network including the specified block.

12. A system, comprising:
a storage unit;
an acquisition unit for determining a specified block of a plurality of blocks and a first number of times to repeat the specified block comprising information to be embedded from the storage unit; and
a processing unit for:
performing a process the first number of times with respect to the specified block to embed the information; and
performing the process with respect to the plurality of blocks other than the specified block a second number of times different from the first number of times.

13. A system, comprising:
a storage unit;
an acquisition unit for determining a specified block of a plurality of blocks and a number of times to repeat the specified block comprising information to be embedded from the storage unit;
a processing unit for:
performing a process the number of times with respect to the specified block to embed the information;
determining that the process failed when performed a last time of the number of times; and
performing the process the number of times with respect to the specified block in response to determining that the process failed.

14. A system, comprising:
a storage unit;
an acquisition unit for determining a specified block of a plurality of blocks and a number of times to repeat the specified block comprising information to be embedded from the storage unit;
a processing unit for performing a process the number of times with respect to the specified block to embed the information;
an acquiring unit for acquiring a result of the process performed the number of times with respect to the specified block; and
an identification unit for performing operations comprising:
determining from the acquired result a determined number of times the process was repeatedly performed on a determined block;
accessing a number of times and a specified block from the storage unit;
determining whether the determined number of times and the determined block determined from the acquired result matches the number of times and the specified block accessed from the storage unit; and
permitting an operation in response to determining the match.

15. A computer readable medium comprising a device including a computer program including a program that when executed performs operations, the operations comprising:
acquiring information to be embedded;
determining from the information to be embedded a specified block of a plurality of blocks and a first number of times to repeat the specified block;
performing a process the first number of times with respect to the specified block to embed the information; and
performing the process with respect to the plurality of blocks other than the specified block a second number of times different from the first number of times.

16. The computer readable medium of claim 15, wherein the operations further comprise:
acquiring a result of the process performed the first number of times with respect to the specified block;
determining from the acquired result a determined number of times the process was repeatedly performed on a determined block;
accessing a number of times and a specified block from a storage unit;
determining whether the determined number of times and the determined block determined from the acquired result matches the number of times and the specified block accessed from the storage unit; and
permitting an operation in response to determining the match.

* * * * *